United States Patent [19]

Sip

[11] 4,318,162
[45] Mar. 2, 1982

[54] SNAP IN COUPLING ASSEMBLY FOR A VEHICLE HEADLAMP

[75] Inventor: Jiri G. Sip, Brunswick, Ohio

[73] Assignee: General Electric Company, Schenectady, N.Y.

[21] Appl. No.: 85,354

[22] Filed: Oct. 16, 1979

[51] Int. Cl.³ ............................................. H01R 33/00
[52] U.S. Cl. ...................................... 362/226; 362/61; 362/306
[58] Field of Search .................. 362/61, 226, 306, 455

[56] References Cited

U.S. PATENT DOCUMENTS

| 1,114,976 | 10/1914 | Fischer | 362/306 X |
| 3,062,951 | 11/1962 | Falge | |
| 3,696,238 | 10/1970 | Szymanski | 362/61 X |
| 4,103,323 | 7/1978 | Urbanek | 362/306 |

FOREIGN PATENT DOCUMENTS

| 2410073 | 9/1975 | Fed. Rep. of Germany | 362/226 |
| 1958761 | 11/1978 | Fed. Rep. of Germany | 362/61 |
| 2910489 | 10/1979 | Fed. Rep. of Germany | 362/61 |
| 1203574 | 3/1958 | France | 362/226 |
| 2280026 | 2/1976 | France | 362/306 |

Primary Examiner—Peter A. Nelson
Attorney, Agent, or Firm—Lawrence R. Kempton; Philip L. Schlamp

[57] ABSTRACT

This invention relates to sealed beam headlamp units and more particularly to a unitary coupling assembly for securing these headlamp units to vehicles. The assembly includes a headlamp having a plurality of couplers secured to the exterior surface thereof. The couplers have curved mating surfaces, centered about point for pivotal movement, which engage the surfaces of complementary couplers secured to a vehicle. The couplers are lockingly secured to each other and form a coupling for attaching the lamp to a vehicle. In a preferred embodiment the assembly employs adjustable couplers for the adjustable and/or preaimed attachment of a headlamp to a vehicle.

10 Claims, 3 Drawing Figures

Fig. 1
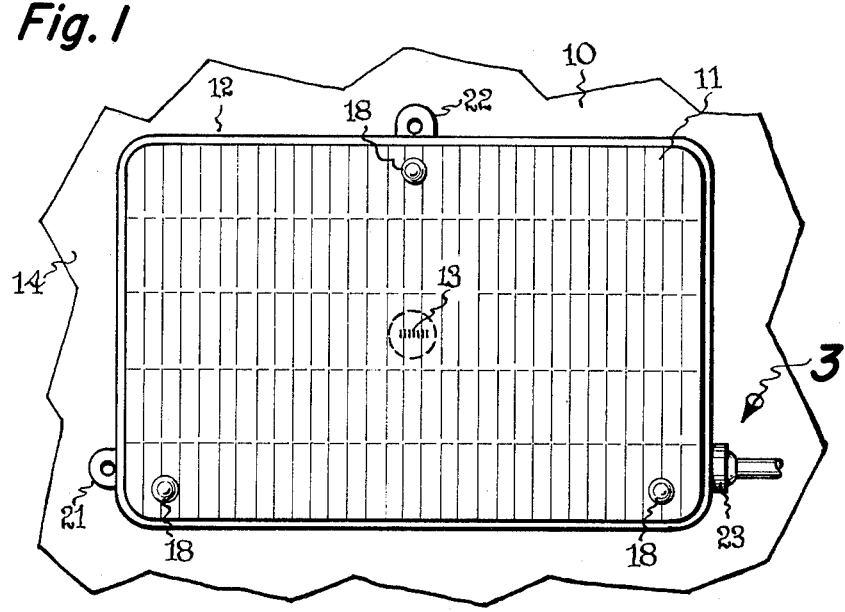
Fig. 2
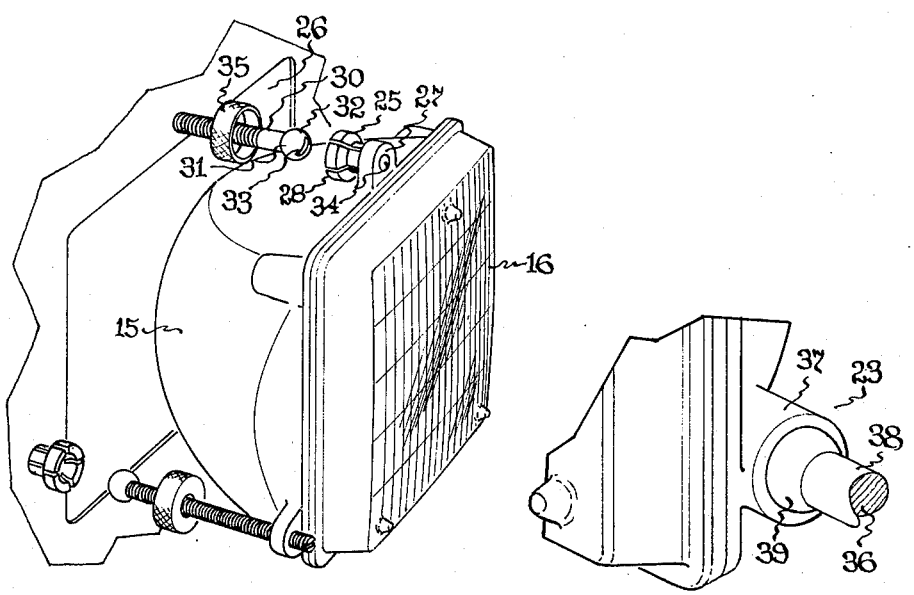
Fig. 3

SNAP IN COUPLING ASSEMBLY FOR A VEHICLE HEADLAMP

This application relates to co-pending applications Ser. Nos. 85454, Oct. 16, 1979, 896,707, Apr. 17, 1978, now U.S. Pat. No. 4,210,841 issued July 1, 1980, 85369, Oct. 16, 1979, 85353, Oct. 16, 1979, 85368, Oct. 16, 1979, the disclosures of which are incorporated herein by reference.

This invention relates to sealed beam headlamp units and more particularly to a unitary coupling assembly for securing these headlamp units to vehicles. The assembly includes a headlamp having a plurality of couplers secured to the exterior surface thereof. The couplers have curved mating surfaces, centered about a point for pivotal movement, which engage the surfaces of complementary couplers secured to a vehicle. The couplers are lockingly secured to each other and form a coupling for attaching the lamp to a vehicle. In a preferred embodiment the assembly employs adjustable couplers for the adjustable and/or preaimed attachment of a headlamp to a vehicle.

Headlamp mounting arrangements customarily comprise a number of heavy metal brackets and rims which structurally secure a headlamp to a vehicle. The lamp envelope is clamped at the lens reflector interface between a series of mounting rims, which are subsequently attached to a mounting plate, which in turn is attached to the vehicle. The headlamp is first attached to the vehicle and then aimed relative thereto by turning the horizontal and vertical adjustment screws located on the assembly. The mountings are complicated and employ a considerable number of heavy metal parts which add substantially to both vehicle weight and cost. The labor costs of aiming and attaching a headlamp by these mounting arrangements are substantial and further contribute to vehicle costs.

The present invention provides an inexpensive headlamp assembly which securely couples a lamp directly to a vehicle and eliminates the need for more complicated constructions. The assembly provides a simple low cost mounting which utilizes a minimum number of parts and enables the one step attachment and aiming of a headlamp. The assembly further provides for the snap fit assembly of the headlamp to the vehicle to reduce labor costs.

The mounting assembly of the present invention and alternate embodiments thereof provide a preaimed lamp assembly which eliminates adjustment of the lamp after it has been attached to the vehicle and hence reduces assembly costs.

The vehicle headlamp assembly also exhibits improved shock and vibration absorption characteristics as compared with those of customary mounting arrangements.

The assembly in a preferred embodiment comprises a sealed beam lamp unit having a glass and/or polymer envelope which comprises a reflector and a light transmissive face. A light source is sealed within the envelope and focused relative thereto for producing a desired beam pattern. A plurality of couplers are directly and fixedly secured to the exterior surface of the envelope in a triangular configuration. Each of the couplers has a curved mating surface which is substantially centered about a point for pivotal movement. The pivot points in combination define a plane substantially perpendicular to the axis of the beam. The individual couplers are alternately molded integral with the lamp envelope or attached thereto by fasteners or cement.

The pivotol surfaces of the lamp couplers secured to the rim lockingly engage the mating surfaces of complementary couplers secured to a vehicle and thereby fixedly attach the lamp to the vehicle.

Either or both the lamp and vehicle couplers can be adjustable, and, as is apparent, a variety of pivotal couplers can be employed in the assembly of the present invention.

In a preferred embodiment, the engaged complementary couplers form a coupling which is generally described as a ball and socket joint. Coupling provides a low cost light weight assembly which predeterminedly aligns a lamp within a vehicle. The coupling thus provides a snap fit connection which thereby reduces material and labor costs.

In these embodiments the couplers positionally interface the lamp and the forward vehicle structure. In still further embodiments either some or all of the vehicle couplers and lamp couplers are adjustable to enable optical alignment or realignment of the lamp relative to the vehicle. Particularly, by referentially locating the light source relative to the lamp envelope, having the lamp couplers referentially secured thereto, and knowing the referential disposition of the vehicle couplers, it is possible to optically preaim the lamp assembly prior to its application to vehicle.

Replacement lamps are also preaimed or adjustably preaimed. Additional means is provided for use in combination with the coupling assembly for securing the lamp coupling and aim.

These other objects and features and a more complete understanding of the aspects of this invention will be apparent from the following detailed description which taken in conjunction with the drawings represents a preferred embodiment of this invention.

DESCRIPTION OF THE DRAWINGS

FIG. 1 is a front view of an assembly of the present invention securing a rectangular headlamp to a vehicle.

FIG. 2 is a side perspective view of the assembly of the present invention shown in exploded form.

FIG. 3 is a side perspective view of an embodiment of one of the couplings.

DETAILED DESCRIPTION

Referring now to FIG. 1, a headlamp assembly 10 in accordance with the present invention is shown in a front view. A sealed lamp unit 11 comprising an envelope 12 having a light source 13 sealed therein and focused relative thereto, produces a light beam having an axis substantially parallel to the axis of the lamp. The headlamp assembly of the present invention secures the unit 10 to a vehicle 14 such that a desired illumination pattern is directed ahead of the vehicle 14. In particular embodiments of the present invention, the headlamp assembly 10 securely and/or demountably and/or adjustably couples the lamp unit 11 to the vehicle 14 such that the lamp beam is aimed relative to the vehicle 14.

More particularly the headlamp unit 11 comprises a light source 13 sealed within an envelope 12, a reflector portion 15 of which is particularly configured and reflectorized for the directional control of reflected light and a further portion of which is configured as a light transmissive face or lens 16. Lamps of this type are disclosed in U.S. Pat. Nos. 2,148,314, 3,989,451 and copending application Ser. No. 896,707 assigned to the assignee of the present invention, the disclosures of which are incorporated herein by reference. The envelopes 12 are formed from glass and/or polymer materials.

The beam pattern produced by the lamp unit 11 is the combined result of the interaction of the light source 13 with the envelope 12. Specifically, the light source 13 is positioned within the envelope 12 to achieve an optically optimal light distribution and hence the light source 13 is focused relative to the envelope 12 regardless of whether the light source 13 is located at the exact geometric focus of the conical reflector 15. In particular, the headlamp light source 13 is focused relative to the reflector 15 alone or alternatively is focused relative to the reflector 15 and lens 16 in combination. In the former instance an optimal beam pattern is established by the reflector 15 which is subsequently modified by the lens prescription. The reflector 15 thus structurally references the beam without regard for lens tolerances. The beam axis thus substantially coincides with the lamp axis. In the latter case, the light source 13 is adjusted within an envelope 12 comprising both a lens 16 and reflector 15 to produce an adequate beam pattern. Although the envelope focused beam pattern is inherently less precise than the reflector focused beam pattern the beam axis remains substantially parallel to the optical axis of the envelope.

In either case the lamp beam is characterized by a plane which is approximately orthogonal to the beam axis (Z axis, axis in the major direction of its propogation). The reference plane is defined conventionally, by the forward surfaces of the reference beads 18 located on the face of lamp 11. The bead surfaces are ground to definitely establish a reference plane which orthogonally characterizes the lamp beam. In particular, three beads are employed on the lamp face wherein the surface of three beads determine the plane.

The headlamp assembly 10 of the present invention is equally applicable to either the above-focused headlamps although a preferred embodiment employs the focused reflector lamp unit inasmuch as the focused reflector unit optimizes the light output of the lamp and always enables the exterior of the reflector to be used as a reference.

The assembly 10 rigidly disposes the lamp unit 11 in the X-Y plane while the Z disposition of the unit is either rigid, adjustable or resilient.

The headlamp assembly 10 is generally comprised of a plurality of discrete couplings which are secured to the exterior surface o the lamp unit. The couplings comprise comlementary lamp and vehicle couplers which are secured to each other. Although one or two complex-multi axis couplings can be employed in alternate embodiments of the headlamp assembly 10, three single axis couplings are preferred to inexpensively and rigidly dispose the lamp unit 11 in a securely aimed position relative to the vehicle 14. In alternate embodiments, the individual couplers are adjustable or non-adjustable, integral with or attached to their respective structures. In particular, the lamp couplers are secured directly to the envelope 12 of the lamp unit 11. Generally the axis of the couplers is parallel to the beam axis through the axis of one or more couplers can be perpendicular to the beam axis.

In FIG. 1, a front view of the coupling assembly 10 of the present invention is disclosed wherein three couplings 21, 22 and 23 directly attach the lamp unit 11 to the vehicle 14 in a triangular, planar reference such that the lamp beam is aimed to produce the desired illumination ahead of the vehicle.

An individual coupling, for instance coupling 22, is either stationary or adjustable and comprises a lamp coupler 25 and a complementary vehicle coupler 26.

The lamp coupler 25 is alternatively integrally molded with the lamp unit 10 or attached hereto by cement and/or other fasteners. The lamp coupler 25 as shown is referentially disposed relative to the reflector 15 of the envelope 12, however it is equally possible to referentially dispose the lamp coupler 25 relative to the envelope lens 16. The lamp coupler 25 generally comprises a support 27 having a curved mating surface 28 for lockingly engaging the complementary mating surface 31 of a vehicle coupler 26 to lockingly secure the lamp unit 11 to the vehicle 14. The curved mating surfaces 28 and 31 are substantially centered for pivotal movement about a point. The pivot points of the couplings 21, 22, and 23 taken in combination define a reference plane substantially orthogonal to the axis of the beam. Specifically the pivot points are not constrained to be points within the interior of couplers 25 or 26 but are any points which establish a reference plane which is substantially orthogonal to the beam axis. Accordingly, the couplers 25 and 26 and their respective mating surfaces 28 and 31 can be formed in a number of different configurations provided the configuration is centered about a point. In a preferred embodiment, the surfaces 28 and 31 are curved to facilitate pivotal movement of the couplers 25 and 26 during adjustment.

In the particular embodiment shown in FIG. 1, the lamp coupler 25 comprises a support 27 and socket 29 having a substantially spherical mating surface 28 for receiving a portion of the vehicle coupler 26 therein.

The vehicle coupler 26 comprises a cylindrical shaft 30 having an anterior boss 32 which complements and is snuggly received within the lamp coupler 25 to lockingly secure the lamp unit 11 to the vehicle 14. The cylindrical shaft 30 is permanently or adjustably secured to the vehicle 14 by, for instance, welding or threading the shaft to the vehicle 14. The vehicle coupler 26 is shown as being adjustable. The cylindrical shaft 30 is threaded at its posterior end to snuggly engage an opening in the vehicle 14. The boss 32 has a notch 33 for receiving a tool therein for axially rotating the vehicle coupler 26 such that the vehicle coupler 26 and particularly boss 32 having a lamp coupler 25 secured thereto is axially moved closer to or farther from the vehicle 14. The referential disposition of the lamp 11 relative to the vehicle 14 is thus adjusted and hence the lamp beam is aimed or reaimed relative to the vehicle 14. An access channel 34 through the lamp coupler 25 enables the vehicle coupler to be adjusted from the front of the lamp 11.

An alternate embodiment of the present invention is disclosed by lamp coupling 21 wherein the coupling 22 is reversed such that the coupling comprising a cylindrical shaft and a boss is adjustably secured to the lamp unit while the socket coupler is secured to the vehicle structure. In this embodiment it is possible to preadjust the lamp couplers such that if the referential positioning of the vehicle couplers is known, the headlamp is preaimed relative to the vehicle.

In this embodiment, a single lamp unit is preadjusted to adapt to a variety of different vehicle structures as might be found on different model cars.

Referring now to FIG. 3, it will be noted that not all couplers must be adjustable or axially disposed parallel to the beam axis. More particularly, the coupling 23 provides a pivot joint having an axis which is perpendicular to the beam axis. The coupling comprise a lamp coupler and a vehicle coupler having mating surfaces centered about a point as described above in connection with coupling 22. In this particular embodiment, the lamp coupler comprises a socket 37 integrally molded to the lamp unit 11 perpendicular to the beam axis. The vehicle coupler comprises a cylindrical shaft 38 having a boss 39 at the anterior end thereof for lockingly engaging the lamp coupler socket 37 in pivotal relation. The posterior end 36 of the vehicle coupler is fixedly attached to the vehicle 14.

The locking engagement of some or all of the couplings 21, 22, and 23 is enhanced by the addition of a retaining means such as a ring 35 which is slipped over the coupling connection and lockingly engages the exterior surface thereof. Although a variety of different retaining means may be employed in connection with the couplings of the present invention, it is advantageous to employ a removable retaining means such that the couplings can be disengaged to demount the headlamp to for instance replace the lamp unit.

In a preferred embodiment the couplings 21 and 22 are adjustable while the third coupling 23 is pivotal. The headlamp 11 is first snapped onto the coupling 23 and subsequently snapped onto the couplings 21 and 22. The headlamp 11 is thus rigidly disposed within the vehicle 14 in a triangular, planar reference such that the lamp unit 11 is aimed relative to the vehicle 14. Adjustment of the couplings 21 and 22 permits further reaiming or alignment of the beam to provide the desired illumination ahead of the vehicle.

The system of three couplings has particular utility in that a minimum number of couplers is employed to attach and aim the headlamp 11. More particularly, if the pivot points of couplers 21 and 23 are in a line parallel to the horizontal axis of the reference plane of the lamp, adjustment of coupling 22 rotates the lamp unit 11 about this axis such that the beam is moved up or down along the vertical axis. Similarly, the pivot points of couplings 22 and 23 establish an axis about which coupling 21 rotates the lamp. As shown, coupling 21 effects both horizontal and vertical adjustment of the lamp 11. Coupling 21 can be dedicated to horizontal adjustment by for instance moving coupling 22 to the corner of the lamp unit adjacent to pivotal coupling such that couplings 22 and 23 have point contacts along an axis parallel to the vertical axis of the lamp.

It will be appreciated that the present invention provides an extremely quick simple and economical assembly for mounting a lamp to a vehicle forward structure. Although the present invention has been described with reference to a seal beam lamp unit, it is readily apparent that the coupling assembly of the present invention may be used in combination with a variety of lamp unit where a precise positioning is needed. In the particular vehicle structure environment of the present lamp assembly, the present coupled headlamp assembly yields surprising advantages. The assembly provide a quick and inexpensive means for demountably and fixedly attaching a lamp unit to the forward structure of a vehicle. Further, in alternate embodiments of the present invention, the lamp unit assembly can provide for the adjustable and aimable positioning of the lamp unit relative to the forward vehicle structure.

Although the invention has been described in its preferred form with a certain degree of particularity, it is understood that the present disclosure of the preferred embodiment has been made only by way of example and that various changes in the details of construction may be resorted to without departing from the true spirit and scope of the invention as hereinafter claimed. It is intended that the patent shall cover, by suitable expression in the appended claims, whatever features of patentable novelty exist in the invention disclosed.

What I claim as new and desire to secure by United States Letters Patent is:

1. A sealed beam vehicle headlamp assembly comprising a lamp unit having a light source sealed within and focused relative to an envelope including a reflector and a light transmissive lens for producing a light beam having an axis substantially parallel to the optical axis of said lamp unit, three couplers directly and fixedly secured to the exterior surface of said envelope in a triangular configuration, each of said couplers having a curved mating surface which is substantially centered for pivotal movement about a point, the points defining a plane substantially perpendicular to the axis of said beam.

2. The vehicle headlamp assembly of claim 1 wherein said couplers are integral of said lamp envelope.

3. The vehicle headlamp assembly of claim 2 wherein said couplers are integral with the reflector portion of said envelope.

4. The vehicle headlamp assembly of claim 1 wherein said couplers are attached to said lamp envelope.

5. The vehicle headlamp assembly of claim 1 wherein said couplers include receptacles for recessively receiving and engagingly securing complementary vehicle couplers.

6. The vehicle headlamp assembly of claim 1 wherein said lamp couplers are fixed in relation to said lamp unit and include adjustment access openings therethrough.

7. The vehicle headlamp assembly of claim 1 wherein said lamp couplers include bosses for entrantly and lockingly engaging complementary vehicle couplers.

8. The vehicle headlamp assembly of claim 1 wherein said lamp couplers are adjustable relative to said lamp unit.

9. The vehicle headlamp assembly of claim 1 wherein the axes of at least two of said couplers are substantially parallel to the optical axis of said lamp.

10. The vehicle headlamp assembly of claim 1 wherein the axis of at least one coupler is perpendicular to the beam axis.

* * * * *